(12) United States Patent
Ahn et al.

(10) Patent No.: US 12,477,273 B2
(45) Date of Patent: Nov. 18, 2025

(54) BEAMFORMING METHOD AND BEAMFORMING SYSTEM USING NEURAL NETWORK

(71) Applicant: DEEPHEARING INC., Daejeon (KR)

(72) Inventors: Kang Hun Ahn, Daejeon (KR); Sang-Hyun Park, Daegu (KR)

(73) Assignee: Deep Hearing Corp., Daejeon (KR)

( * ) Notice: Subject to any disclaimer, the term of this patent is extended or adjusted under 35 U.S.C. 154(b) by 172 days.

(21) Appl. No.: 18/035,297

(22) PCT Filed: Sep. 29, 2021

(86) PCT No.: PCT/KR2021/013328
§ 371 (c)(1),
(2) Date: May 4, 2023

(87) PCT Pub. No.: WO2022/097919
PCT Pub. Date: May 12, 2022

(65) Prior Publication Data
US 2023/0269532 A1    Aug. 24, 2023

(30) Foreign Application Priority Data
Nov. 4, 2020    (KR) .................. 10-2020-0146191

(51) Int. Cl.
*H04R 3/00*    (2006.01)
*G06F 17/14*    (2006.01)
(Continued)

(52) U.S. Cl.
CPC ............. *H04R 3/005* (2013.01); *G06F 17/14* (2013.01); *G06N 3/08* (2013.01); *H04R 1/406* (2013.01);
(Continued)

(58) Field of Classification Search
CPC .. H04R 3/005; H04R 1/406; H04R 2201/401; H04R 2201/403; H04R 2430/03;
(Continued)

(56) References Cited

U.S. PATENT DOCUMENTS 10,522,167 B1    12/2019    Ayrapetian et al.
10,593,347 B2    3/2020    Baek et al.
(Continued)

FOREIGN PATENT DOCUMENTS

JP    2020503570 A    1/2020
JP    2020034624 A    3/2020
(Continued)

OTHER PUBLICATIONS

Xiao et al, Deep Beamforming Networks for Multichannel Speech Recognition, IEEE (Year: 2016).*
(Continued)

*Primary Examiner* — Carolyn R Edwards
*Assistant Examiner* — Kuassi A Ganmavo
(74) *Attorney, Agent, or Firm* — Sughrue Mion, PLLC (57) ABSTRACT

Provided are a beamforming method and a beamforming system. The beamforming method may comprise the steps of: receiving a first sound signal and a second sound signal by respectively using a first microphone and a second microphone spaced apart from the first microphone by a pre-determined distance; obtaining a Fourier transform result for each of the first sound signal and the second sound signal; obtaining a phase difference between the first sound signal and the second sound signal from the Fourier transform result; performing an arithmetic operation by inputting the phase difference to a beamforming model by using a neural network; performing element multiplication on an operation result of the neural processor and the Fourier
(Continued)

transform result for the first sound signal; and outputting a result of the element multiplication.

6 Claims, 9 Drawing Sheets

(51) Int. Cl.
$\quad$ *G06N 3/0464* $\quad$ (2023.01)
$\quad$ *G06N 3/08* $\quad$ (2023.01)
$\quad$ *G06N 3/084* $\quad$ (2023.01)
$\quad$ *H04B 7/06* $\quad$ (2006.01)
$\quad$ *H04N 7/15* $\quad$ (2006.01)
$\quad$ *H04R 1/40* $\quad$ (2006.01)

(52) U.S. Cl.
$\quad$ CPC .......... *G06N 3/0464* (2023.01); *G06N 3/084* (2013.01); *H04B 7/0617* (2013.01); *H04N 7/15* (2013.01); *H04R 2201/401* (2013.01); *H04R 2430/03* (2013.01); *H04R 2430/23* (2013.01)

(58) Field of Classification Search
$\quad$ CPC ...... H04R 2430/23; G06F 17/14; G06N 3/08; G06N 3/0464; G06N 3/04; G06N 3/084; H04B 7/0617; H04B 7/0682; H04B 7/0695; H04N 7/15
$\quad$ See application file for complete search history.

(56) References Cited

U.S. PATENT DOCUMENTS

| | | | | |
|---|---|---|---|---|
| 11,017,791 | B2 | 5/2021 | Chang et al. | |
| 2014/0185814 | A1* | 7/2014 | Cutler | H04R 5/027 |
| | | | | 381/26 |
| 2014/0226838 | A1* | 8/2014 | Wingate | G10L 21/0272 |
| | | | | 381/111 |
| 2014/0322887 | A1* | 10/2014 | Miller | H10N 70/011 |
| | | | | 438/382 |
| 2016/0111107 | A1* | 4/2016 | Erdogan | G10L 25/03 |
| | | | | 704/226 |
| 2019/0005976 | A1* | 1/2019 | Peleg | G10L 25/30 |
| 2019/0043491 | A1* | 2/2019 | Kupryjanow | G10L 21/0208 |
| 2019/0219660 | A1* | 7/2019 | Cordourier Maruri | ...................... |
| | | | | G01S 3/8034 |
| 2019/0318757 | A1* | 10/2019 | Chen | G10L 19/022 |
| 2020/0111483 | A1 | 4/2020 | Shafran et al. | |
| 2020/0342891 | A1 | 10/2020 | Deng et al. | |
| 2020/0349928 | A1* | 11/2020 | Mandal | G10L 15/30 |
| 2021/0110813 | A1* | 4/2021 | Khoury | G10L 15/063 |

FOREIGN PATENT DOCUMENTS

| | | |
|---|---|---|
| KR | 20180111271 A | 10/2018 |
| KR | 20180115984 A | 10/2018 |
| WO | 2019199554 A1 | 10/2019 |

OTHER PUBLICATIONS

European Search Report 21889384.0, Issued on Nov. 4, 2024.
Shoko Arakit et al., "Exploring Multi-Channel Features for Denoising-Autoencoder-Based Speech Enhancement", Published: Apr. 19, 2015, Retrieved from the Internet: URL: https://ieeexplore.ieee.org/stampPDF/getPDF.jsp?tp=&arnumber=7177943&ref=aHR0cHM6Ly9pZWVleHBsb3JlLmllZWUub3JnL2RvY3VtZW50LzcxNzc5NDM=, Retrieved on Oct. 22, 2024, pp. 116-120.
Japanese Office Action 2023-551942, Issued on Jun. 11, 2024.

* cited by examiner

BEAMFORMING METHOD AND BEAMFORMING SYSTEM USING NEURAL NETWORK

CROSS-REFERENCE TO RELATED PATENT APPLICATIONS

The present application is a U.S. national stage application under 35 U.S.C. § 371 of PCT Application No. PCT/KR2021/013328, filed Sep. 29, 2021, which claims priority to Korean Patent Application No. 10-2020-0146191, filed Nov. 5, 2020. The disclosures of the aforementioned priority applications are incorporated herein by reference in their entireties.

TECHNICAL FIELD

The present invention relates to a beamforming method and a beamforming system using a neural network.

BACKGROUND ART

The cocktail party effect refers to the phenomenon where party attendees are able to selectively focus on and comprehend conversations with specific speakers, despite being in a noisy environment. In machines, the ability to implement this selective listening, or beamforming, has been known as the cocktail party problem. Recently, there has been a growing effort to use neural networks to solve the cocktail party problem. Improving the performance of beamforming techniques is closely related to the performance of audio-related electronic products, and it can also be a crucial social issue, especially in the case of hearing aids.

Beamforming can refer to the process of analyzing sound acquired by two or more microphones to reconstruct the target signal. In order to achieve this, techniques that minimize the size of incoming sounds while satisfying given constraints have been used for a long time, such as creating artificial delays for each signal from the microphones and then combining them. Recently, studies have been actively conducted on improving the performance of neural network-based MVDR (minimum variance distortionless response) beamformers, as well as on training methods for neural network models that implement beamforming.

DISCLOSURE

Technical Problem

The problem to be solved by the present invention is to use a neural network in order to overcome the limitation of requiring a large amount of computation to obtain spatial information in rule-based beamforming, but design the neural network structure to be optimized for beamforming. And, the problem to be solved by the present invention is to provide a beamforming method and beamforming system using a neural network capable of minimizing the amount of computation.

Technical Solution

A beamforming method according to an embodiment of the present invention, comprising: a step of respectively receiving a first sound signal and a second sound signal using a first microphone and a second microphone disposed apart from the first microphone by a predetermined distance; A step of obtaining Fourier transform results for the first sound signal and the second sound signal, respectively; A step of acquiring a phase difference between the first sound signal and the second sound signal from the Fourier transform results; a step of processing the phase difference using a neural processor in the beamforming model; A step of performing element-wise multiplication between the result of the neural processor and the Fourier transform result for the first sound signal; and a step of outputting the result of the element-wise multiplication.

The step of performing element-wise multiplication may further include a step of applying a mask to the result of the operation before performing the element-wise multiplication.

The step of performing element-wise multiplication may further include a step of performing gain control after performing the element-wise multiplication.

The predetermined distance may be within the range of 10 cm to 14.

The beamforming method may further include a step of training the beamforming model using the phase difference.

A beamforming system according to an embodiment of the present invention, comprising: a first microphone for receiving a first sound signal; a second microphone disposed apart from the first microphone by a predetermined distance to receive a second sound signal; a first STFT module for obtaining a Fourier transform result of the first sound signal; a second STFT module for obtaining a Fourier transform result of the second sound signal; a phase difference acquisition module acquiring a phase difference between the first sound signal and the second sound signal from the result of the Fourier transform; a neural processor for performing neural network computation using the phase difference as input and the beamforming model; an element-wise multiplication module for performing an element-wise multiplication between the result of the neural processor and the Fourier transform result for the first sound signal; and an output module for outputting the result of the element-wise multiplication.

The beamforming system may further include a masking module for applying a mask to the calculation result before performing the element-wise multiplication.

The beamforming system may further include a gain control module for performing gain control after performing the element-wise multiplication.

The predetermined distance may be within the range of 10 cm to 14 cm.

The beamforming system may further include a learning model for training the beamforming model using the phase difference.

Advantageous Effects

According to the embodiments of the present invention, it is possible to efficiently implement beamforming by using only the phase difference to restore the sound received from the microphone, without the need for computing the steering vector and spatial correlation matrix for various noise environments. Additionally, the application of a lightweight auto-encoder enables lightweight and miniaturized systems.

BRIEF DESCRIPTION OF DRAWINGS

Drawing 1 is a diagram for explaining the beamforming system according to an embodiment of the present invention.

Drawing 2 is a diagram for explaining a computing device for implementing the beamforming apparatus according to embodiments of the present invention.

Drawing 3 is a diagram for explaining a beamforming method according to an embodiment of the present invention.

Drawing 4 is a diagram for explaining a beamforming method according to an embodiment of the present invention.

Drawing 5 is a diagram for explaining a beamforming method according to an embodiment of the present invention.

Drawing 6 is a diagram for explaining an example of implementing the beamforming method according to an embodiment of the present invention.

Drawing 7 is a diagram for explaining the beamforming system according to an embodiment of the present invention.

Drawing 8 is a diagram for explaining the beamforming system according to an embodiment of the present invention.

Drawing 9 is a diagram for explaining the beamforming system according to an embodiment of the present invention.

Drawings 10 and 11 are diagrams for explaining the advantageous effects of the beamforming method and beamforming system according to embodiments of the present invention.

BEST MODE

Embodiment of the Invention

Hereinafter, The embodiments of the present invention will be described in detail with reference to the accompanying drawings so that those skilled in the art can easily carry out the present invention. However, the present invention may be implemented in many different forms and is not limited to the embodiments described herein. And in order to clearly explain the present invention in the drawings, parts irrelevant to the description are omitted, and similar reference numerals are attached to similar parts throughout the specification.

Throughout the specification and claims, when a part is said to "include" a certain component, it means that it may further include other components without excluding other components unless otherwise stated. In addition, terms such as " . . . part", " . . . unit", "module" and the like in the specification refer to a unit that processes at least one function or operation, and may be implemented in hardware, software, or a combination of hardware and software. Additionally, at least some of the beamforming methods, beamforming devices, and beamforming systems according to the embodiments described below can be implemented as a program or software, which can be stored on a computer-readable medium.

Figure 1:
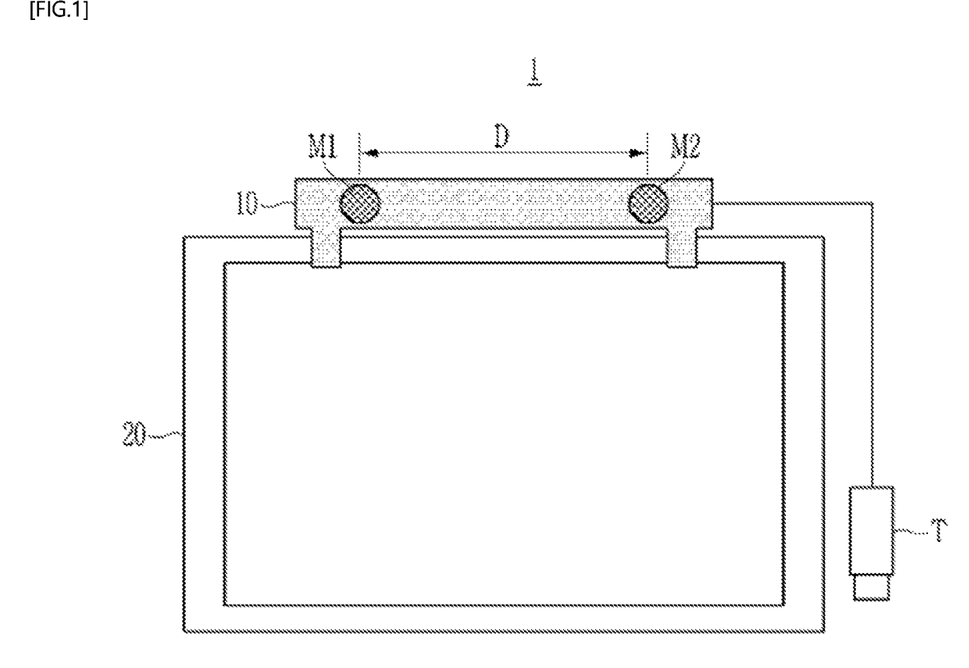

FIG. 1 is a drawing for explaining a beamforming system according to an embodiment of the present invention.

Referring to FIG. 1, a beamforming system(1) according to an embodiment of the present invention may include a beamforming device(10) including a first microphone(M1), a second microphone(M2), and a connection terminal(T), and a monitor(20).

The beamforming device(10) may be attached to the monitor(20) and receive sound using the microphones(M1, M2). For example, the beamforming device(10) may receive the voice of a person participating in a video conference in front of the monitor(20) using the microphones (M1, M2). In particular, the beamforming device(10) can receive the voice of a person participating in a video conference in an environment with a lot of ambient noise.

The beamforming device(10) may perform beamforming on the received sound signal using the microphones (M1, M2), and then output the obtained beamformed sound signal. For example, the beamforming device(10) can distinguish the voice of a person participating in a video conference in an environment with a lot of ambient noise and provide it to another computing device (e.g., a personal computer connected to the monitor(20)). Then, the computing device can provide the distinguished person's voice, for example, to other video conference participants. The connection terminal(T) can be used for the beamforming device (10) to provide the distinguished voice output signal to another computing device, and in this embodiment, the connection terminal (T) may be a USB (Universal Serial Bus) terminal, but the scope of the present invention is not limited thereto.

In this embodiment, the first microphone(M1) and the second microphone(M2) may be arranged at a predetermined distance(D) apart. For example, the first microphone (M1) can receive the voice and ambient noise of a person participating in a video conference from a first side (e.g., left side) (i.e., a first sound signal), and the second microphone (M2) can receive the voice and ambient noise of a person participating in a video conference from a second side(e.g., right side), which is a predetermined distance(D) apart from the first microphone(M1) (i.e., a second sound signal).

In this embodiment, the predetermined distance(D) between the first microphone(M1) and the second microphone(M2) may be 10 cm to 14 cm, preferably 12 cm, but the scope of the present invention is not limited thereto.

Figure 2:
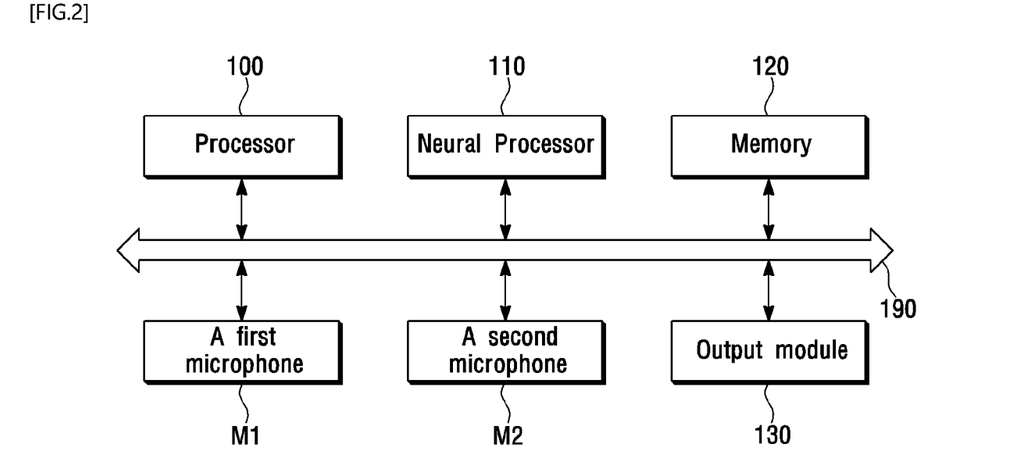

FIG. 2 is a diagram for explaining a computing device for implementing a beamforming device according to embodiments of the present invention.

Referring to FIG. 2, a computing device for implementing a beamforming device (10) according to the embodiments of the present invention may include a processor(100), a neural processor(110), a memory(120), an output module(130), a first microphone(M1), and a second microphone(M2). The computing device may also operate to perform the beamforming method according to the embodiments of the present invention. The processor (100), neural processor (110), memory (120), output module (130), first microphone (M1), and second microphone (M2) can exchange data with each other through a bus(190).

The processor(100) performs overall control of the beamforming device(10) and, together with or independently of the neural processor(110), can perform the functions and methods described in this specification. The processor(100) can be implemented as various types of processors, such as an Application Processor(AP), Central Processing Unit (CPU), or Graphic Processing Unit(GPU), and the scope of the present invention is not limited to a specific processor.

The neural processor(110) can perform neural network operations, particularly among the functions and methods described in this specification. For example, the neural processor(110) can perform computations using the beamforming model described in this specification. The neural network here may include a Convolutional Neural Network (CNN), but the scope of the present invention is not limited thereto The memory(120) can store data or applications required for the processor(100) or neural processor(110) to perform operations. It may include various types of volatile memories, such as Dynamic Random Access Memory (DRAM) or Static Random Access Memory (SRAM), non-volatile memory such as flash memory, or a combination of volatile and non-volatile memories.

The output module (130) can include any input/output interface device for outputting the beamformed sound signal obtained after performing beamforming on the sound signal received using the microphones(M1, M2).

Also, at least some of the beamforming methods, beamforming devices, and beamforming systems according to the embodiments of the present invention can be implemented as a program or software running on a computing device, and the program or software can be stored on a computer-readable medium. Moreover, at least some of the beamforming methods, beamforming devices, and beamforming systems according to the embodiments of the present invention can be implemented as hardware that can be electrically connected to a computing device.

The beamforming device (10) described in FIG. 1 is implemented to be attached to a monitor (20) and can be connected to another computing device to provide a discriminated human voice output signal. It is particularly noteworthy here that the beamforming device (10) has its neural processor (110), allowing it to perform neural network operations for discriminating the voice of a person participating in a video conference in a noisy environment without using the computing resources of other computing devices.

Figure 3:
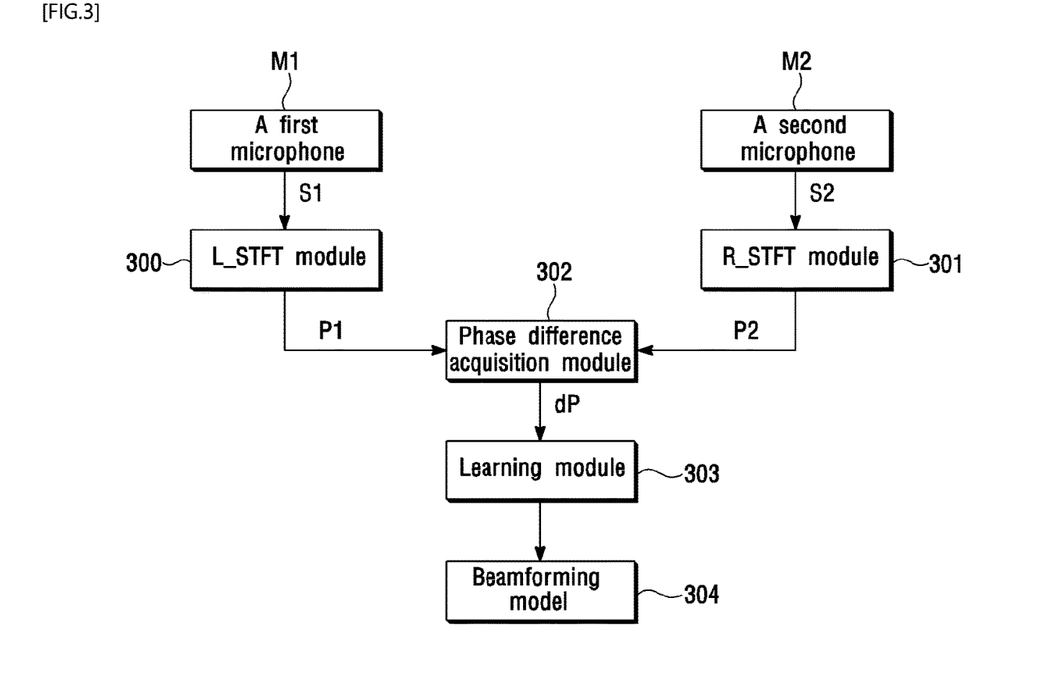
Figure 4:
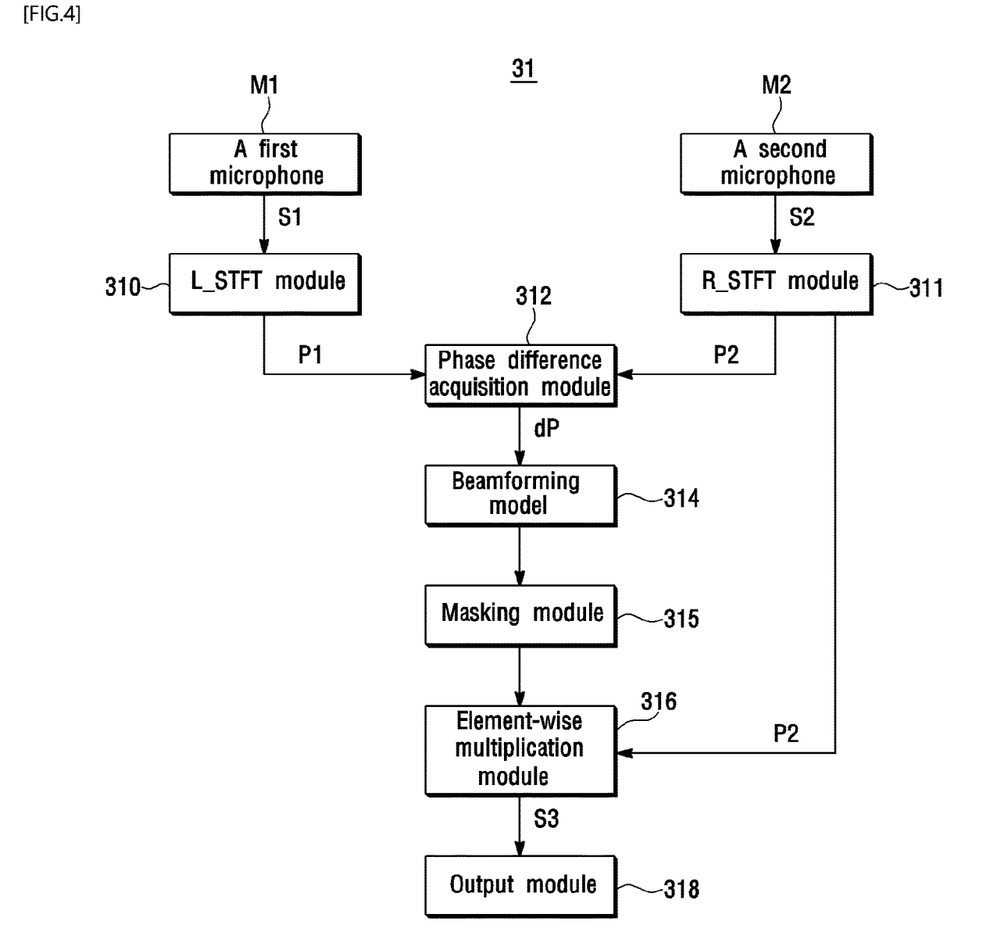
Figure 5:
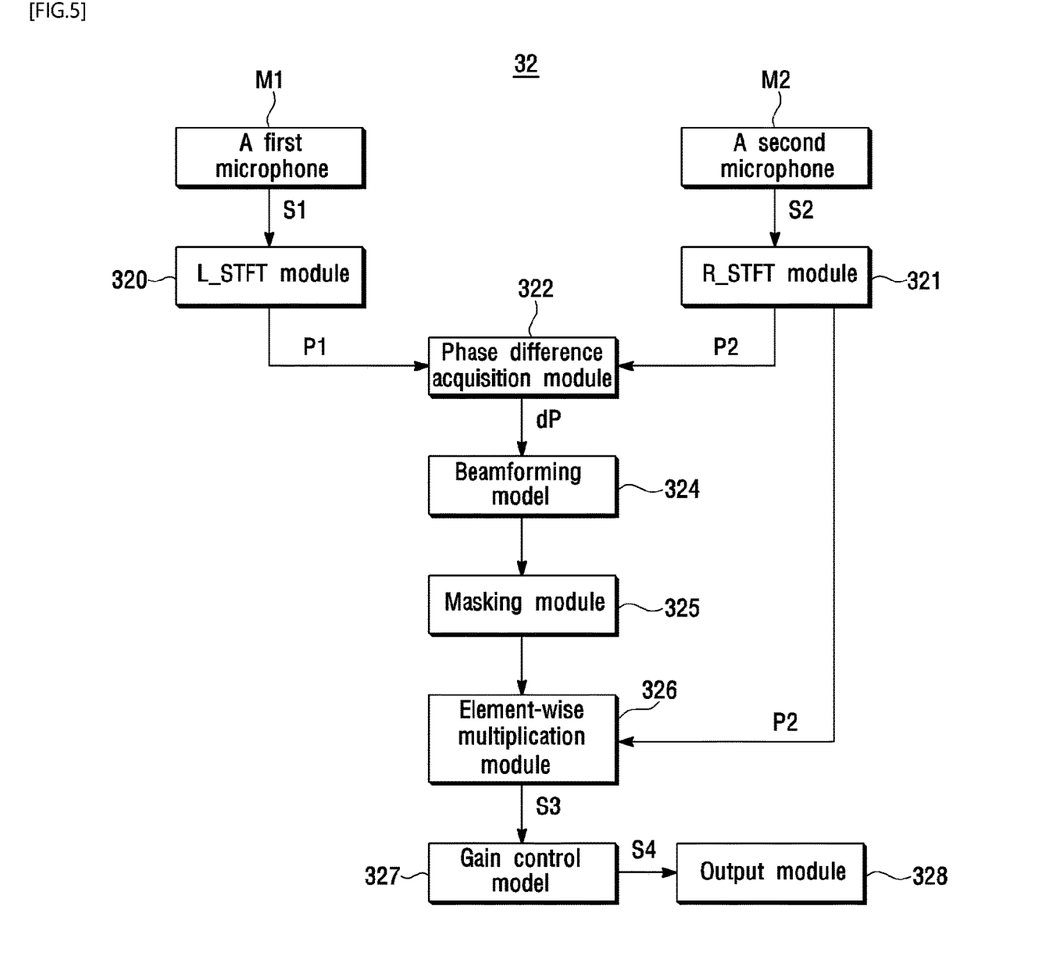

Referring to FIG. 3 to 5, FIG. 3 will describe a beamforming method according to embodiments of the present invention.

FIG. 3 is a diagram for explaining a beamforming method according to an embodiment of the present invention.

Referring to FIG. 3, in the beamforming method(30) according to an embodiment of the present invention, the first microphone M1 receives the first sound signal(S1), which includes a person's voice from a video conference and ambient noise from the first side. The first sound signal S1 is then transmitted to the first STFT (Short Time Fourier Transform) module 300, also indicated as L_STFT module.

The first STFT module (300) performs a Fourier transform operation on the first sound signal (S1), obtaining a Fourier transform result (P1).

Meanwhile, the second microphone (M2), positioned at a predetermined distance(D) from the first microphone(M1), receives the second sound signal(S2) from the second side. For example, This signal also includes a person's voice from a video conference and ambient noise. The second sound signal(S2) is transmitted to the second STFT module(301), also indicated as R_STFT module in drawings.

The second STFT module(301) performs a Fourier transform operation on the second sound signal(S2), obtaining a Fourier transform result(P2).

The phase difference acquisition module(302) may calculates the phase difference (dP) between the first sound signal(S1) and the second sound signal(S2) using the Fourier transform results(P1, P2) from the first STFT module(300) and the second STFT module(301).

The learning module(303) trains the beamforming model (304) using the phase difference(0||) between the first sound signal(S1) and the second sound signal(S2). As a result, the beamforming model(304) can perform beamforming based only on the phase difference between the two sound signals received through the first microphone(M1) and the second microphone(M2).

During learning, the predetermined distance(D) between the first microphone(M1) and the second microphone(M2) can be between 10 cm and 14 cm, preferably 12 cm, but is not limited to this range. When the predetermined distance (D) is 12 cm, the performance of the learned beamforming model 304 can be improved even when the distance between the first microphone (M1) and the second microphone (M2) is 10 cm to 14 cm during inference.

FIG. 4 is a diagram for explaining a beamforming method according to an embodiment of the present invention.

Referring to FIG. 4, in the beamforming method(31) according to another embodiment of the present invention, the first microphone(M1) receives the first sound signal(S1) from the first side, which includes a person's voice from a video conference and ambient noise. The first sound signal (S1) is transmitted to the first STFT module(310), also indicated as L_STFT module in drawings.

The first STFT module(310) performs a Fourier transform operation on the first sound signal(S1), obtaining a Fourier transform result(P1).

Meanwhile, the second microphone(M2), positioned at a predetermined distance(D) from the first microphone(M1), can receive the second sound signal(S2) from the second side. For example, the second microphone(M2) can receive the second sound signal(S2), which includes a person's voice from a video conference and ambient noise from the second side, and transmit it to the second STFT module (311), also indicated as R_STFT module in the drawings.

The second STFT module (311) performs a Fourier transform operation on the second sound signal(S2) received from the second microphone(M2), obtaining a Fourier transform result (P2).

The phase difference acquisition module (312) can obtain the phase difference (dP) between the first sound signal(S1) and the second sound signal(S2) using the Fourier transform results(P1, P2) provided from the first STFT module (310) and the second STFT module (311), respectively.

As explained in FIG. 3, the learned beamforming model (314) can perform neural network operations (i.e., inference operations) by receiving the phase difference (dP) between the first sound signal(S1) and the second sound signal(S2) as input.

The masking module (315) can apply a mask to the inference operation results, and subsequently, the element-wise multiplication module (316) can perform element-wise multiplication on the inference operation results (or masked results) and the Fourier transform result(P2) provided by the second STFT module (311). Here, element-wise multiplication can be an operation that multiplies each component of two matrices of the same size.

The output module (317) can output the element-wise multiplication result (S3) provided by the element-wise multiplication module (316). For example, the output module (317) can output the beamformed sound signal (S3), obtained by performing beamforming on the sound signals received through the microphones (M1, M2) using the beamforming model (314). The beamformed sound signal (S3) may be the distinguished voice of a person participating in a video conference in a noisy environment, which can be provided to another computing device (e.g., a personal computer connected to a monitor (20)), and subsequently provided to other video conference participants.

FIG. 5 is a diagram for explaining an implementation example of a beamforming method according to an embodiment of the present invention.

At least two microphones are required for directional hearing. The geometric shape of the microphone array has spatial characteristics in which the signals received by each microphone are aligned. The process of acquiring a mask for beamforming can be formalized as follows. First, let's assume that spectrograms can be obtained by performing an STFT (short-time Fourier transform) on each signal received from multiple microphones. $S_t^{(l)}(\omega)$ is the voice to be obtained and is expressed as following.

$$S_t^{(l)}(\omega) = a^{(l)}(\omega) A_t(\omega)$$

$$a^{(l)}(\omega) = \exp\left((-1)^l i \frac{\omega d}{2c} \cos\theta\right)$$

And, when $N_t^{(l)}(\omega)$ is considered as noise, The input of a microphone array with both voice and noise can be represented as $W_t^{(l)}(\omega) = S_t^{(l)}(\omega) + N_t^{(l)}(\omega)$.

$a^{(l)}(\omega)$ represents the characteristics of the microphone array depending on the angle. When applying a filter $W_t(\omega)$ to the input spectrogram, the result becomes $W_t(\omega) X_t^{(l)}(\omega) = W_t(\omega) a^{(l)}(\omega) A_t(\omega) + W_t(\omega) N_t^{(l)}(\omega)$. Therefore, $W_t(\omega)$ can be designed to minimize the magnitude of the input signal while retaining the desired signal. If the bold characters represent vectors, when $Y_t(\omega) = W^H(\omega) \cdot X_t(\omega)$ is given, minimizing $E[|Y_t(\omega)|^2]$ constraint of $W^H(\omega) \cdot a(\omega) = 1$ is obtained, and the solution can be found as $$W(\omega) = \frac{R_{XX}^{-1} a(\omega)}{a^H(\omega) R_{XX}^{-1} a(\omega)}.$$

Here, the superscript H refers to the matrix obtained by taking the complex conjugate and then transposing it. Thus, the spectrogram of the desired speech can be obtained as $S_t(\omega) = W^H(\omega) X_t(\omega)$ using the calculated filter. The most important part when implementing beamforming using this method is to accurately determine the steering vector $a(\omega)$ and the spatial correlation matrix $R_{XX}$.

In this way, in the MVDR method without using a neural network, a steering vector is required to mathematically model the path taken by the sound from the source to each microphone to accurately satisfy MVDR. However, mathematical modeling is very difficult when the microphone and the user's mouth are at a close distance, such as in a video call, where they are positioned within approximately 1 meter, and the microphone spacing is also at a close distance, such as several centimeters or tens of centimeters. In addition, there are limitations when the user moves irregularly, as in an actual video call environment, and if the steering vector is set to a fixed value, the user's discomfort increases. To overcome these limitations, a neural network can be used instead of a steering vector.

Moreover, the phase difference matrix used as input to the neural network in this method is easier to obtain than the spatial correlation matrix used in conventional methods to obtain the source's location information, making it easier to obtain the location information of the source. In the beamforming method according to an embodiment of the present invention, a neural network for spatial information is trained using only two microphones, allowing sound to be acquired in a predetermined direction. Therefore, it has the following advantages:

1. There is no need to accurately define the steering vector for moving targets when measuring with fixed microphones in real situations.

2. The divergence of the singular points that occur during the process of calculating the linear filter disappears. This reduces the side lobe which is power of $Y_t(\omega)$ other than the front, automatically bringing the side lobe cancellation effect.

When looking at the STOI values of the restored speech at angles other than the front, the side STOI of MVDR is larger than the neural network's STOI when speech signals come in from multiple directions, meaning that the neural network can more accurately distinguish the frontal speech signal.

When there are no obstacles between the source and the microphone, the sound's travel path is only affected by the angle of the source. Since the distance between both microphones and the source is the same, the sound coming from the front is the same on both sides. That is, the time difference of arrival (TDOA) of the front source is close to 0. By using this point, the sound coming from the front can be preserved.

When call the sounds $X_t^{(1)}(\omega)$, $X_t^{(2)}(\omega)$ that originates from a source at an arbitrary location and reaches two microphones, From each of these signals, two phase matrices $\phi_t^{(1)}(\omega)$, $\phi_t^{(2)}(\omega)$ can be calculated. The closer the difference between these phase matrices is to 0, the more it indicates that the sound was created by a source close to the front. To differentiate this, we can consider a function that outputs a value closer to 0 as the input gets farther from 0, and outputs 1 as the input gets closer to 0. With this function, it is possible to create a mask that only retains signals coming from the front. Therefore, by finding the mask $M_t(\omega)$ that minimizes the error L below, we can restore the signal coming from the front.

$$L = \frac{1}{T} \sum_{t=0}^{T-1} \left( s(t) - ISTFT\left(M_t(\omega) \odot X_t^{(1)}(\omega)\right) \right)$$

When using Fourier transforms, signals can be thought of as a simple sum of pure tones for each frequency. However, two pure tones of the same frequency can create an entirely new pure tone signal when combined through phase delay. This issue can create situations where the phase difference between both microphones does not accurately correspond to the source's angle, making it inaccurate to create a mask solely based on phase difference. As obtaining speech requires a filter that processes a wide range of frequencies, this problem must be addressed. To overcome this, the embodiments of the present invention provide a method for recognizing phase differences through neural networks and the reference microphone's spectrogram patterns.

Figure 6:
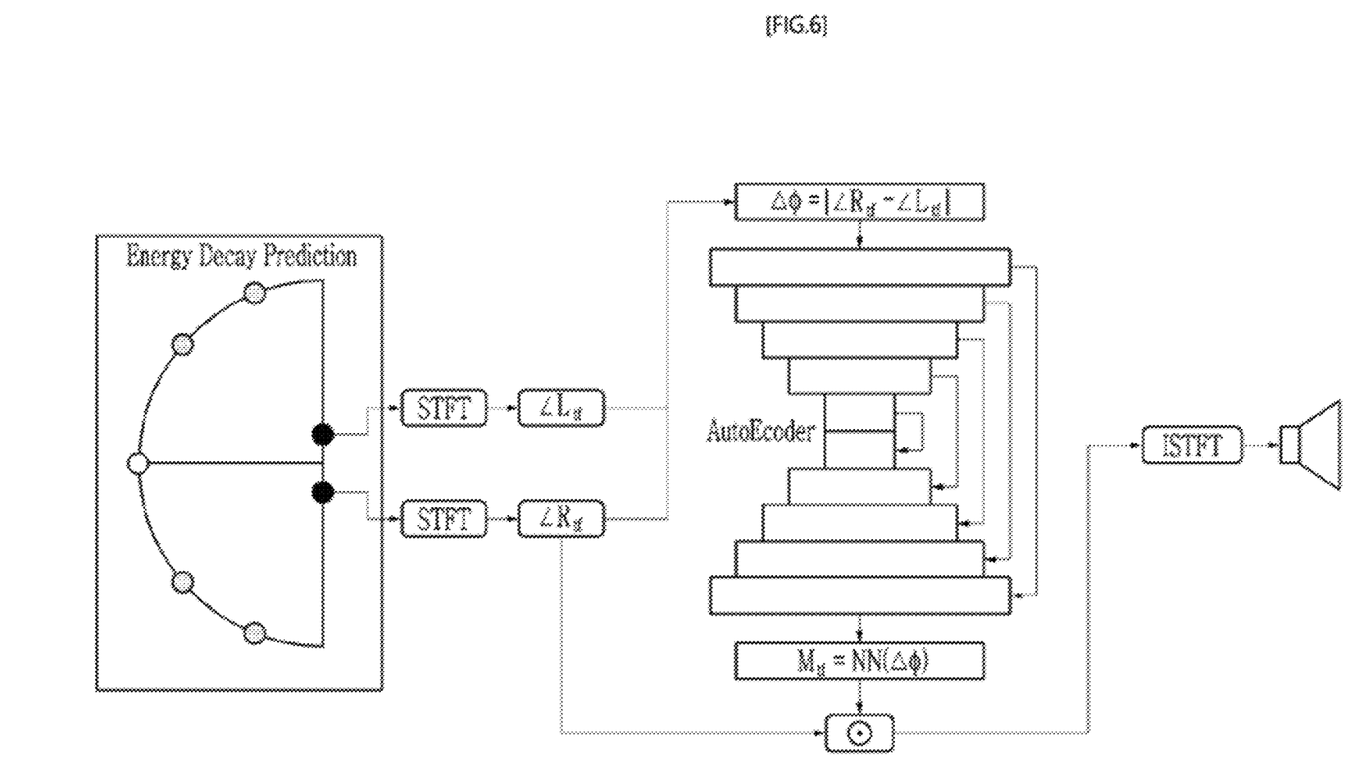

Referring to FIG. 6, the mask to be designed is defined as a real number between 0 and 1, allowing it to perform a similar function to the IBM (Ideal Binary Mask). However, since there are values in between, it can also become an SBM (Soft Binary Mask). Looking at previous research on neural networks using IBM, noisy phase was used as is. From this, it is possible to reconstruct speech from a noisy spectrogram by only preserving frequency regions related to the speech composition. Therefore, the mask obtained using the SBM method with a neural network creates a directional auditory mask applied to the magnitude from the phase difference, which retains the signal even if there is a phase difference in the elements. On the other hand, there is a method suggesting optimizing the assumed time delay to obtain clearer directional information from TDOA, but various embodiments of the present invention use CNN. CNN is more efficient for 2D matrices like images and requires less computational power. Also, convolution filters are optimized for the reduction width according to the ideal mask's phase difference. To prevent the problem of not being able to learn the target speech pattern when only phase difference is input to the neural network, backpropagation can be used. The MSE (mean squared error) calculated in the time domain is used as the loss function for training the mask with phase information, which is similar to the method mentioned earlier. By restoring the masked spectrogram with the inverse STFT (ISTFT), the loss function can be used to compare with the clean target sound in the time domain. In this case, the gradient value to be updated can include speech pattern information for the reference microphone.

To train the model with various situational data, a simulation method was used to generate a specific dataset, and the neural network was used to reconstruct the target's speech. Stereo channel sources were created through a 10×10×10 m spatial simulation. The microphones were positioned at a height of 2 m and spaced 6 cm apart at two locations (9, 5.06, 2) and (9, 4.94, 2). The source was placed on a semicircle with a diameter of 1 meter, with the center of the semicircle being the same as the center of the microphones. The desired source location is at the front 90°, located at (7, 5, 2). Four sections [0°, 40°), [40°, 80°), [100°, 140°), [140°, 180°) are divided along the semicircle, and noise sources are placed at random positions in each section. Some of the speech datasets were used for training data, while others were used for test data. The noise dataset consists of two artificial noises (speech shape noise and babble noise) and the DEMAND database, which contains 13 recorded noises. The training data consists of two artificial noises and 8 recorded noises (cafe, car, kitchen, meeting, metro, restaurant, station, and traffic). The test data consists of 5 recorded noises (bus, cafeteria, living room, office, and public square). To generate noise, noise of the length of the speech was extracted from four random points of the same noise signal. Then, the sound was simulated to come from the 4 sources, and a system that accommodates 2 microphones was adopted.

For the training data, 40 conditions were used, i.e., combinations of 10 noise situations and four SNRs (0 dB, 5 dB, 10 dB, 15 dB). The test data used 20 different conditions, i.e., combinations of 5 noise situations and 4 SNRs (2.5 dB, 7.5 dB, 12.5 dB, 17.5 dB). In this case, only the energy decrease according to distance was simulated using the Room impulse response with the image-source method. To not consider reverberation, the reverberation time ($T_{60}$) was set to 0.

Each signal received by the two microphones was transformed into the Fourier domain using STFT. The STFT uses a 256-point Hamming window for a 16 kHz sample rate signal. The window shift is 128 points (with 128 points of overlap). The same conditions are used when performing the ISTFT operation after the neural network manipulation is complete. The model structure follows the structure in Table 1.

The input values include only the lower 128 frequencies of the STFT results. The mask obtained as a result of the neural network is multiplied by the spectrogram of the input 128 frequencies, and the 129th frequency is filled with 0 to obtain the restored signal through ISTFT.

TABLE 1

| Name | Input | Layer | Output |
|---|---|---|---|
| Conv1 | B, 128, T, 1 | (5.3), (1.1), (2.0) | B, 128, T, 5 |
| Conv2 | B, 128, T, 5 | (4.1), (2.1), (1.0) | B, 64, T, 5 |
| Conv3 | B, 64, T, 5 | (5.3), (1.1), (2.0) | B, 64, T, 10 |
| Conv4 | B, 64, T, 10 | (4.1), (2.1), (1.0) | B, 32, T, 10 |
| Conv5 | B, 32, T, 10 | (5.3), (1.1), (2.0) | B, 32, T, 18 |
| Conv6 | B, 32, T, 18 | (4.1), (2.1), (1.0) | B, 16, T, 18 |
| Conv7 | B, 16, T, 18 | (5.3), (1.1), (2.0) | B, 16, T, 32 |
| Conv8 | B, 16, T, 32 | (4.1), (2.1), (1.0) | B, 8, T, 32 |
| Conv9 | B, 8, T, 32 | (5.3), (1.1), (2.0) | B, 8, T, 32 |
| deConv1 | B, 8, T, 32 | (4.1), (2.1), (1.0) | B, 16, T, 64 |
| Conv10 | B, 16, T, 64 | (5.3), (1.1), (2.0) | B, 16, T, 18 |
| deConv2 | B, 16, T, 18 | (4.1), (2.1), (1.0) | B, 32, T, 36 |
| Conv11 | B, 32, T, 36 | (5.3), (1.1), (2.0) | B, 32, T, 10 |
| deConv3 | B, 32, T, 10 | (4.1), (2.1), (1.0) | B, 64, T, 20 |
| Conv12 | B, 64, T, 20 | (5.3), (1.1), (2.0) | B, 64, T, 5 |
| deConv4 | B, 64, T, 5 | (4.1), (2.1), (1.0) | B, 128, T, 10 |
| Conv13 | B, 128, T, 10 | (5.3), (1.1), (2.0) | B, 128, T, 5 |
| Conv14 | B, 128, T, 5 | (1.1), (1.1), (0.0) | B, 128, T, 2 |

Here, the input is composed of (batch, frequency, time step, channel). The convolution layer is composed of (filter height, filter width), (stride height, stride width), (padding height, padding width). The output is composed of (batch, frequency, time step, channel). All activation functions used were PReLU. For the final layer's activation function, a sigmoid function was used to apply the real part and imaginary part of the mask for channels 1 and 2, respectively.

The advantageous effects according to the embodiments of the present invention will be described later with reference to FIGS. 9 and 10.

Figure 7:
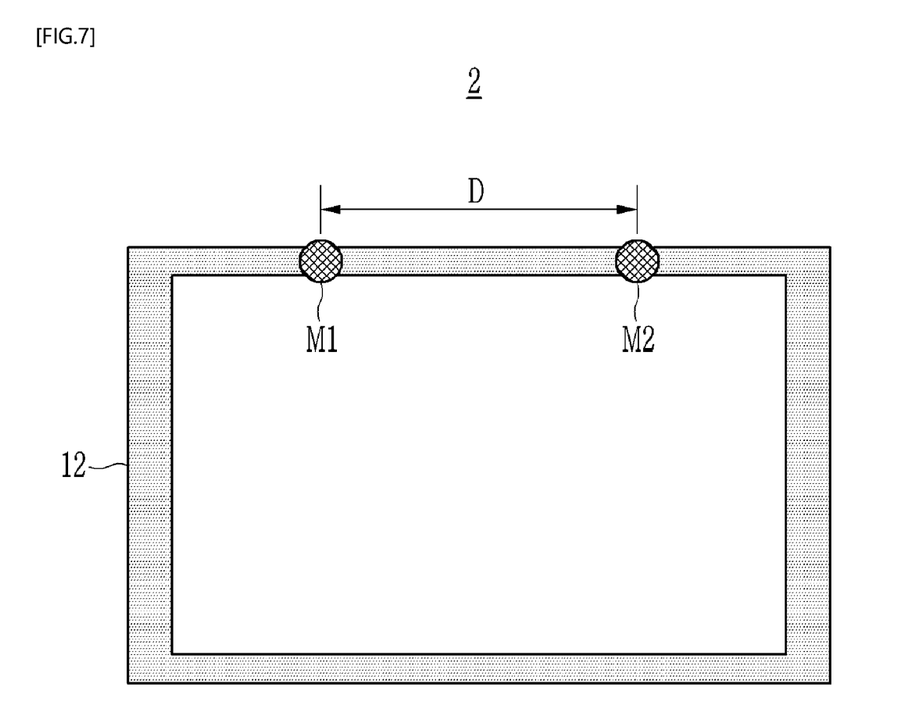
Figure 8:
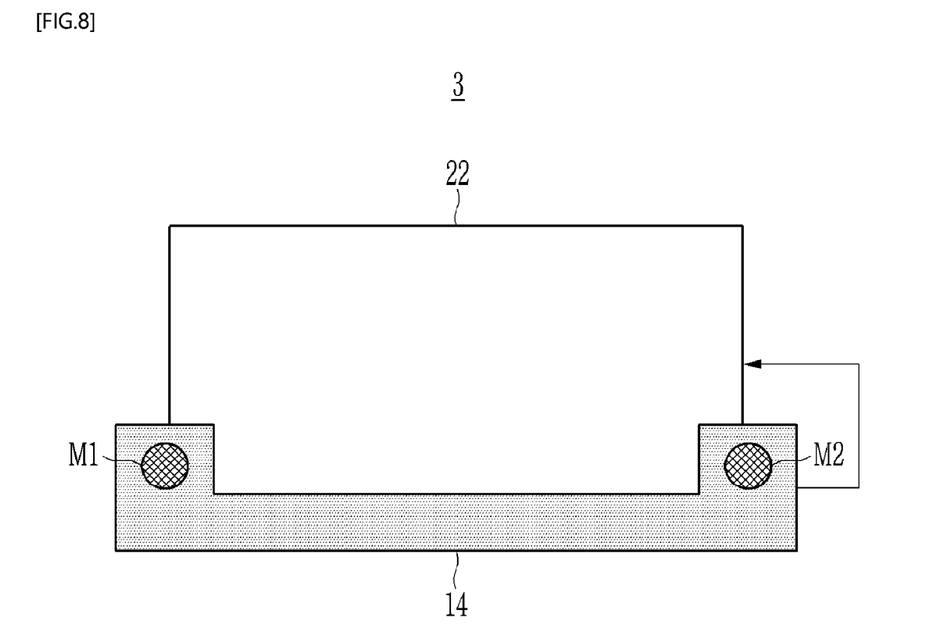

FIG. 6 is a drawing for explaining a beamforming system according to an embodiment of the present invention, FIG. 7 is a drawing for explaining a beamforming system according to an embodiment of the present invention, and FIG. 8 is a drawing for explaining a beamforming system according to an embodiment of the present invention.

Referring to FIG. 6, the beamforming system (2) according to an embodiment of the present invention can be implemented as a monitor equipped with a first microphone (M1) and a second microphone (M2).

Referring to FIG. 7, the beamforming system (2) according to an embodiment of the present invention can be implemented to include a holder-type device (14) that can accommodate portable computing devices (22), such as smartphones. After performing beamforming on the sound signals received using the microphones (M1, M2), the obtained beamformed sound signals can be provided to the portable computing device (22) through any connection means. Then, the computing device (22) can provide the discerned person's voice, for example, to other video conference participants.

Referring to FIG. 8, the beamforming system (4) according to an embodiment of the present invention can be implemented as an attachable device (16) that can be attached to portable computing devices (22), such as smartphones. After performing beamforming on the sound signals received using the microphones (M1, M2), the obtained beamformed sound signals can be provided to the portable computing device (22) through any connection means. Then, the computing device (22) can provide the discerned person's voice, for example, to other video conference participants.

Figure 9:
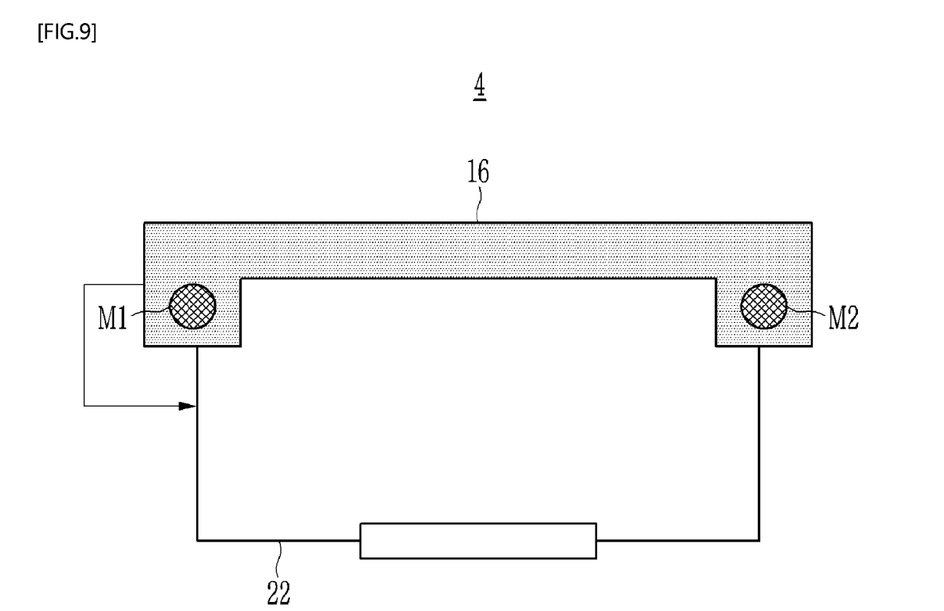
Figure 10:
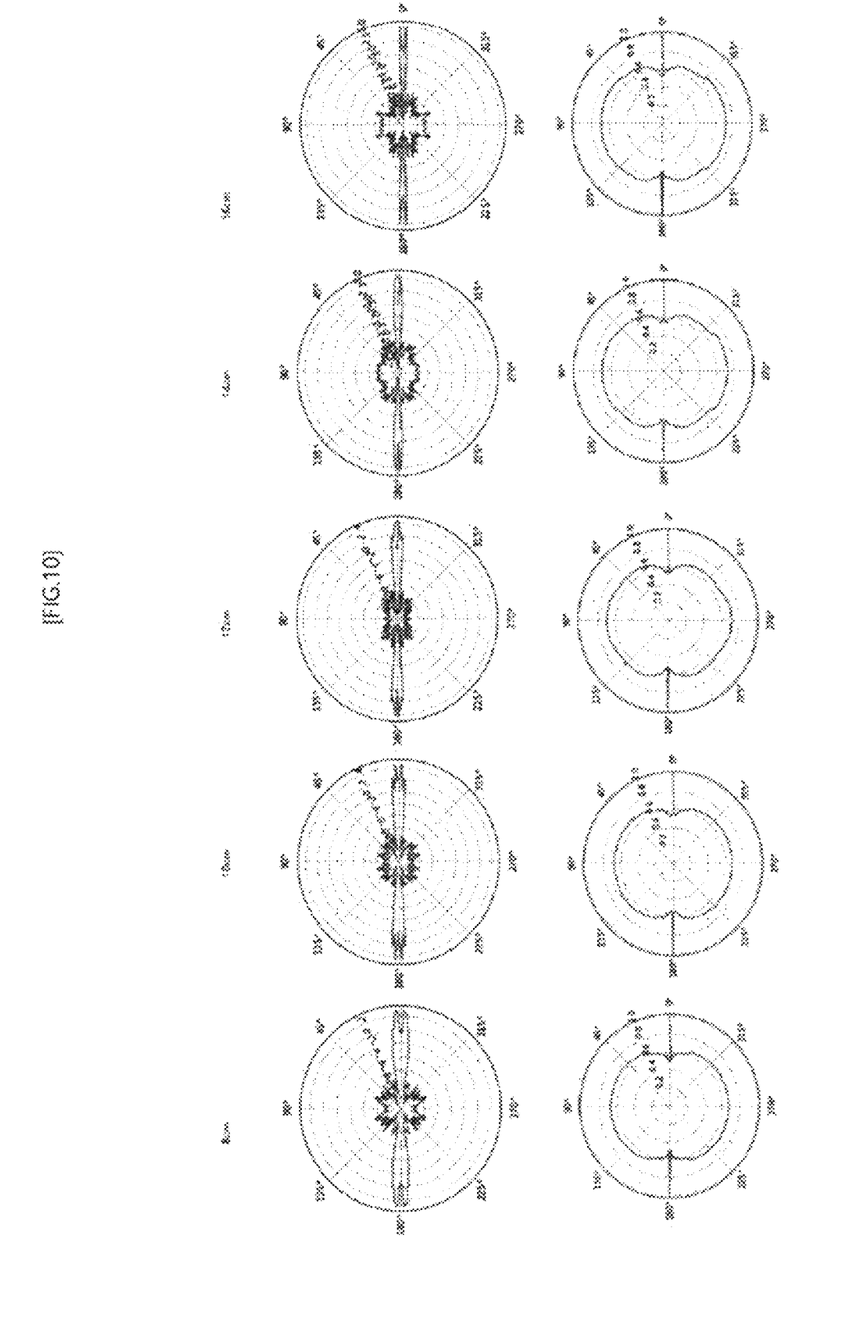
Figure 11:
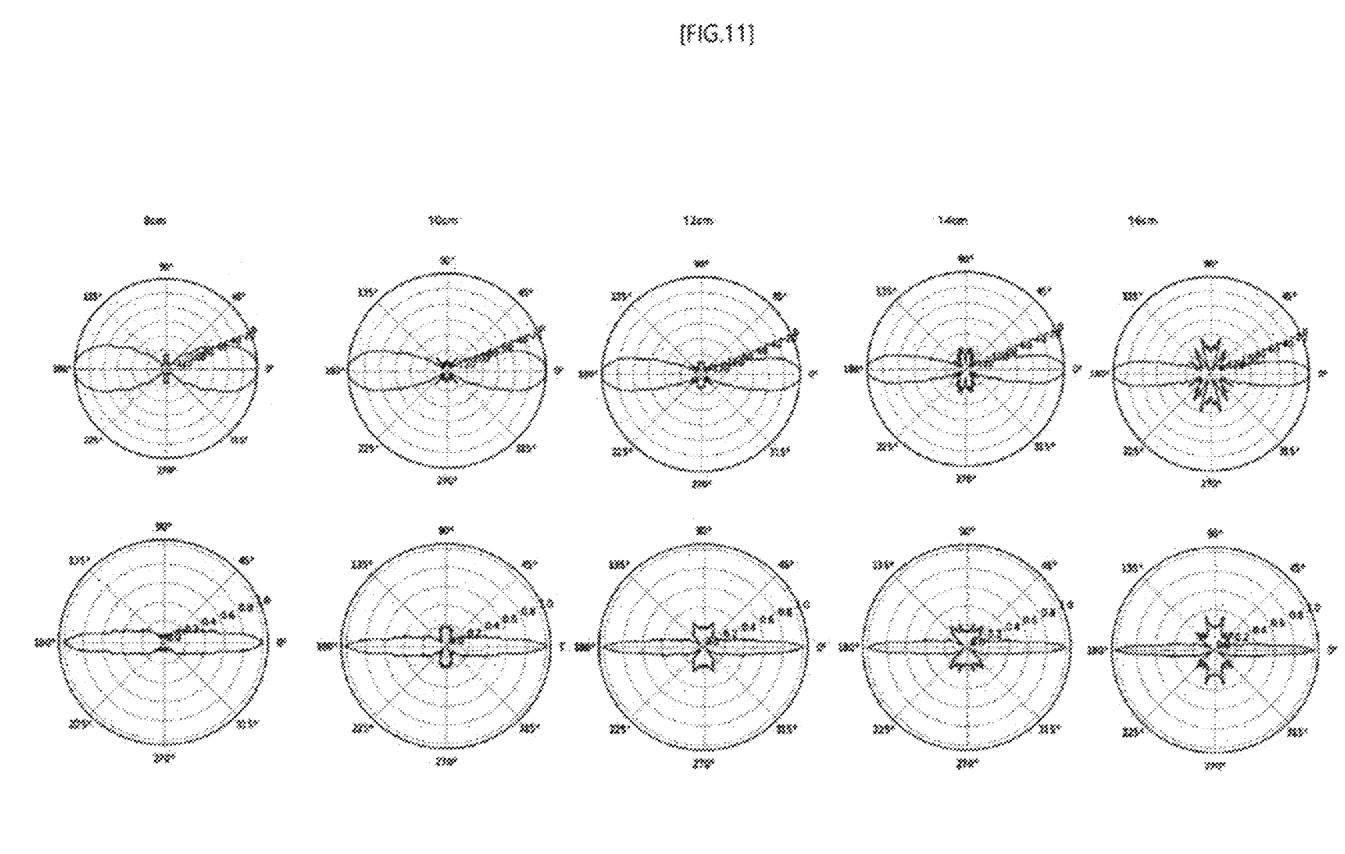

FIGS. 9 and 10 are drawings for explaining the advantageous effects of the beamforming method and beamforming system according to embodiments of the present invention.

Using a beamforming algorithm with a predetermined distance (D) of 12 cm between the first microphone (M1) and the second microphone (M2), the results were measured by simulating data with microphone distances of 8, 10, 12, 14, 16. FIG. 9 shows the sound magnitude (upper row) and STOI (Short-Time Objective Intelligibility) score (lower row) for each angle using the classical method (MVDR) for beamforming, while FIG. 10 shows the sound magnitude (upper row) and STOI score (lower row) for each angle using the neural network-based beamforming according to various embodiments of the present invention.

STOI is an indicator related to the degree of restored sound, regardless of the sound's magnitude. In the classical method, STOI appears higher in directions other than the desired direction, while in the neural network approach according to various embodiments of the present invention, it appears lower. Through this, it can be seen that the neural network method according to various embodiments of the present invention more reliably separates the speech of speakers in undesired directions and experiences less interference According to the embodiments of the present invention described so far, beamforming can be efficiently implemented by restoring the speech received by the microphone using only the phase difference, without the need to compute steering vectors for various noise environments.

In the case of the existing MVDR, it is difficult to obtain steering vectors in environments with heavy reverberation, and even in environments without reverberation, it is difficult to obtain a simple form of steering vector, as it is not possible to obtain a form assuming a distant sound source for video calls. Also, in real situations, speakers often move, making it difficult to use in such environments as the more accurate the prediction of the steering vector. In addition, when calculating the spatial correlation matrix $R_{xx}$ expressed above, it is impossible to make accurate predictions since noise-mixed sound is used. However, this method uses a neural network to learn spatial information from a large amount of data, and as it uses a method of learning with a clean speech signal as the target speech without calculating the steering vector, accurate learning is possible. Comparing the average SSNR (Segmented Signal to Noise Ratio) of the frontal sound obtained by calculating 824 test data using an artificial intelligence model trained by this method and the conventional MVDR method, the noise-included sound is −1.557, the sound using MVDR is −0.120, and the model passed through the neural network is 2.165, showing that the neural network model has the highest value.

Although the embodiments of the present invention have been described in detail above, the scope of the present invention is not limited thereto, and various modifications and improvements made by those skilled in the art using the basic concepts of the present invention defined in the following claims also fall within the scope of the present invention.

The invention claimed is:

1. A beamforming method, comprising the steps of:
receiving, respectively, a first sound signal and a second sound signal using a first microphone and a second microphone disposed apart from the first microphone by a predetermined distance;
obtaining Fourier transform results for the first sound signal and the second sound signal, respectively;
acquiring a phase difference between the first sound signal and the second sound signal from the Fourier transform results;
inputting only the phase difference into a beamforming model and performing neural network operations using a neural processor, wherein the neural processor performs the beamforming method independently or together with a processor that performs overall control of a beamforming device, and wherein the beamforming model is trained to perform the neural network operations based only on the phase difference;
performing element-wise multiplication between corresponding components of a matrix representing an output of the neural network operations and a matrix representing the Fourier transform results for the first sound signal; and
outputting the element-wise multiplication results,
wherein the neural processor obtains a mask using a Soft Binary Mask (SBM) method through the neural network operations.

2. The beamforming method of claim 1, wherein the predetermined distance is within a range of 10 cm to 14.

3. The beamforming method of claim 1, further comprising a step of training the beamforming model using the phase difference.

4. A beamforming system, comprising:
a first microphone for receiving a first sound signal;
a second microphone disposed apart from the first microphone by a predetermined distance to receive a second sound signal;
a processor configured to obtain Fourier transform results for the first sound signal and Fourier transform results for the second sound signal, and to acquire a phase difference between the first sound signal and the second sound signal from the result of the Fourier transform; and
a neural processor configured to perform neural network operations using only the phase difference as input, with a beamforming model, wherein the neural processor performs the beamforming method independently or together with the processor that performs overall control of a beamforming device, and wherein the beamforming model is trained to perform the neural network operations based only on the phase difference,
wherein the processor performs element-wise multiplication between corresponding components of a matrix representing an output of the neural network operations and a matrix representing the Fourier transform results for the first sound signal and outputs the result of the element-wise multiplication,
wherein the neural processor obtains a mask using a Soft Binary Mask (SBM) method through the neural network operations.

5. The beamforming system of claim 4, wherein the predetermined distance is between 10 cm and 14 cm.

6. The beamforming system of claim 4, further comprising:
a learning model for training the beamforming model using the phase difference.

* * * * *

UNITED STATES PATENT AND TRADEMARK OFFICE
CERTIFICATE OF CORRECTION

| | | |
|---|---|---|
| PATENT NO. | : 12,477,273 B2 | Page 1 of 1 |
| APPLICATION NO. | : 18/035297 | |
| DATED | : November 18, 2025 | |
| INVENTOR(S) | : Kang Hun Ahn and Sang-Hyun Park | |

It is certified that error appears in the above-identified patent and that said Letters Patent is hereby corrected as shown below:

On the Title Page

(71) Applicant should read: Deep Hearing Corp., Daejeon (KR)

Signed and Sealed this
Third Day of February, 2026

John A. Squires
*Director of the United States Patent and Trademark Office*